United States Patent [19]
Wartmann

[11] Patent Number: 5,708,532
[45] Date of Patent: Jan. 13, 1998

[54] DOUBLE-SIDED TELECENTRIC MEASUREMENT OBJECTIVE

[75] Inventor: Rolf Wartmann, Hallgarten, Germany

[73] Assignee: Jos. Schneider Optische Werke Kreuznach GmbH & Co. KG, Kreuznach, Germany

[21] Appl. No.: 659,044

[22] Filed: Jun. 3, 1996

[30] Foreign Application Priority Data

Jun. 3, 1995 [EP] European Pat. Off. .............. 95108559

[51] Int. Cl.$^6$ .............................. G02B 13/22; G02B 21/02
[52] U.S. Cl. .......................... 359/663; 359/362; 359/658; 359/756
[58] Field of Search .................. 359/362, 363, 359/642, 649, 663, 793, 656–658, 733, 754, 755, 756, 771–783

[56] References Cited

U.S. PATENT DOCUMENTS 4,189,211  2/1980  Taylor ................................. 359/663

FOREIGN PATENT DOCUMENTS

| | | |
|---|---|---|
| 0 299 474 | 1/1989 | European Pat. Off. . |
| 2940 | 1/1971 | Japan .................................... 359/663 |
| 573790 | 11/1977 | U.S.S.R. ................................ 359/663 |
| 1 248 362 | 9/1971 | United Kingdom . |
| 1260923 | 1/1972 | United Kingdom .................... 359/663 |
| 1 423 597 | 2/1976 | United Kingdom . |

OTHER PUBLICATIONS

Abstract of SU 909,652; Soviet Inventions Illustrated, Week K01, issued 16 Feb. 1983 Derwent Publications Ltd, London, G.B.

Patent Abstracts of Japan, No. 4–042208, vol. 16, No. 218 (P–1357) Dainippon Screen Mfg Co Ltd, Inventor: Hayashi Naohisa.

*Primary Examiner*—Thong Nguyen
*Attorney, Agent, or Firm*—Herbert Dubno

[57] ABSTRACT

A double sided telecentic measurement objective for contactless length measurement in two-dimensional and three-dimensional space. The objective has an image-side optical system consisting of three elements equivalent to those of an object-side optical system but in the reverse order, including a cemented positively refracting lens element turned toward the object of image respectively, a collecting lens spaced by an air gap from the cemented lens, and a dispersive meniscus spaced by an air gap from the collecting lens. The widths of the air gaps between the collecting lenses and the meniscus are substantially greater than the widths of air gaps between the cemented lens elements and the collecting lenses.

4 Claims, 3 Drawing Sheets

DOUBLE-SIDED TELECENTRIC MEASUREMENT OBJECTIVE

FIELD OF THE INVENTION

My present invention relates to a double-sided telecentric measuring objective for contactless length measurements in two-dimensional and three-dimensional space.

BACKGROUND OF THE INVENTION

For the contactless measurement of objectives in automatic product lines, video cameras are increasingly of interest as pick-ups for measurement systems. A measuring camera, for example, is described in U.S. Pat. No. 5,453,785.

The measurement principle utilizes the central projection of object points in an image plane. The image is then digitalized and the digitized image is interpreted in an image-processing computer and stretches between contour features of the object in the image are measured. A precondition for this type of measurement approach, of course, is a sufficiently precisely defined set of chamber constants and position of the main points photogram-metric. These parameters define the so-called internal orientation of the measurement camera (see the aforementioned patent).

The measurement precision in video measurement techniques is directly dependent upon the precision and stability of the parameters of the internal orientation. These parameters give the correlation between the measured image size and the geometry of the object. They may be determined by a camera calibration procedure.

When a measuring system is intended not only for a single kind of measurement and the position of the article to be measured cannot be maintained with a high level of precision, camera calibration must be frequent and is expensive and time-consuming since it must be carried out with each change in the article to be measured or each change in the position of the article.

It is known to avoid such camera calibration or at last to reduce the frequency of such calibration by providing telecentric objectives. The use of a telecentric objective makes the image size independent from the object distance and does not require as meticulous adjustment of the measuring unit. By providing telecentric objectives in automatic production lines, the effective quality control can be substantially simplified. Nevertheless, even with such optical systems, the measurement system must be calibrated and in particular, the dependency of the reduction scale or ratio of the image to the object size must be determined for the selected image plane position.

It has already been proposed to completely eliminate the need for camera calibration by providing double-sided telecentric optical systems. Such objectives are comprised of two distinct optical systems or partial systems aligned along a common optical axis which have the same general constructions and between which an iris diaphragm is disposed. The lens elements of the second optical system are disposed in an opposite or reverse order from the sequence of the lens elements of the first optical system. Such telecentric measuring objectives are afocal and have a fixed image ratio or reduction which is independent not only of the object position but also of the image position.

One such afocal and telecentric objective is described in SU Patent 935 099. Because of the construction of this objective, pupil aberration exists, i.e. in spite of the afocal construction, not all of the major rays are telecentric. The pupil aberration results in a change of distortion upon shifting of the object plane or image plane. This objective is, therefore, unsuitable for measurement purposes. In GB Patent 1,423,597, afocal systems for transcription of markings is described. This system does not permit correction of pupil aberration and of coma. It is also unsuitable as a measurement objective.

EP 0 299 473 A2 describes a system which, as a consequence of its construction, allows only small variation of the object plane or image plane. The optical system of this patent also is not highly suitable for measurement purposes since control of the sharpness is not possible and a scale of reproduction which deviates significantly from −1 cannot be achieved with high image quality. This objective is also costly to produce and with significant variations of the object plane positions, cause a considerable loss of imaging quality.

OBJECTS OF THE INVENTION

It is, therefore, the principal object of the present invention to provide a double-sided measurement objective for contactless measurement systems which makes superfluous internal calibration of the camera, is of simple construction and can ensure high image quality even for a substantial range in variation of the object plane position.

Another object of this invention is to provide a telecentric objective for the purposes described whereby drawbacks of the earlier systems described can be avoided.

Still another object of the invention is to provide a telecentric objective for a measurement camera which is of simple and economical construction.

SUMMARY OF THE INVENTION

These objects and others which will become apparent hereinafter in a telecentric lens system of the double-sided type having the object-side optical part system and the image-side optical systems as described, each with three lens elements of which a cemented lens element is turned toward the object side or the image side of the respective system, a collecting lens is spaced by an air gap from the cemented lens element and a dispersive meniscus lens is spaced by an air gap from the collecting lens, the image-side optical system thus having lenses equivalent to those of the object-side system but in the reverse order.

According to the invention, the cemented positively refracting lens element has a dispersive cemented surface and is made up of a convergent lens and a divergent lens cemented thereto.

According to the invention, moreover, the two optical systems are so arranged that the back focal point of the first optical system coincides with the front focal point of the second optical system along the optical axis. The image scale (or magnification or reduction ratio) of the total system is equal to the ratio of the focal lengths of the optical part-systems.

It has been found to be important to the invention that the third element of each optical system is a dispersive meniscus whose convex side is turned toward the object.

With a construction of this type, a wide range of variation is possible in the selection of the location of the object and image planes.

Even in the event that the object or image plane positions are not selected to be optimum, the image can remain free from coma so that a high measurement precision is assured within the total band width of the possible object/image relationship.

An optical system according to the invention has, if applied to scaled down imaging, and allows an image size aperture of at least 0.14. It is corrected for an image circle diameter of 0.2·f2 where f2 is the focal length of the image-side optical system.

A variation of the object plane position in the range of $$\pm 3\,mm \cdot \left(\frac{f1}{f2}\right)^2$$

is possible without loss of image quality. In this relationship f1 is the focal length of the object-side optical system.

By appropriate selection of the optical systems which are applicable, objectives with various focal lengths for the image-side or the object-side optical systems can be provided and the measurement objective can be of the double sided telecentric type for different magnification ratios.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
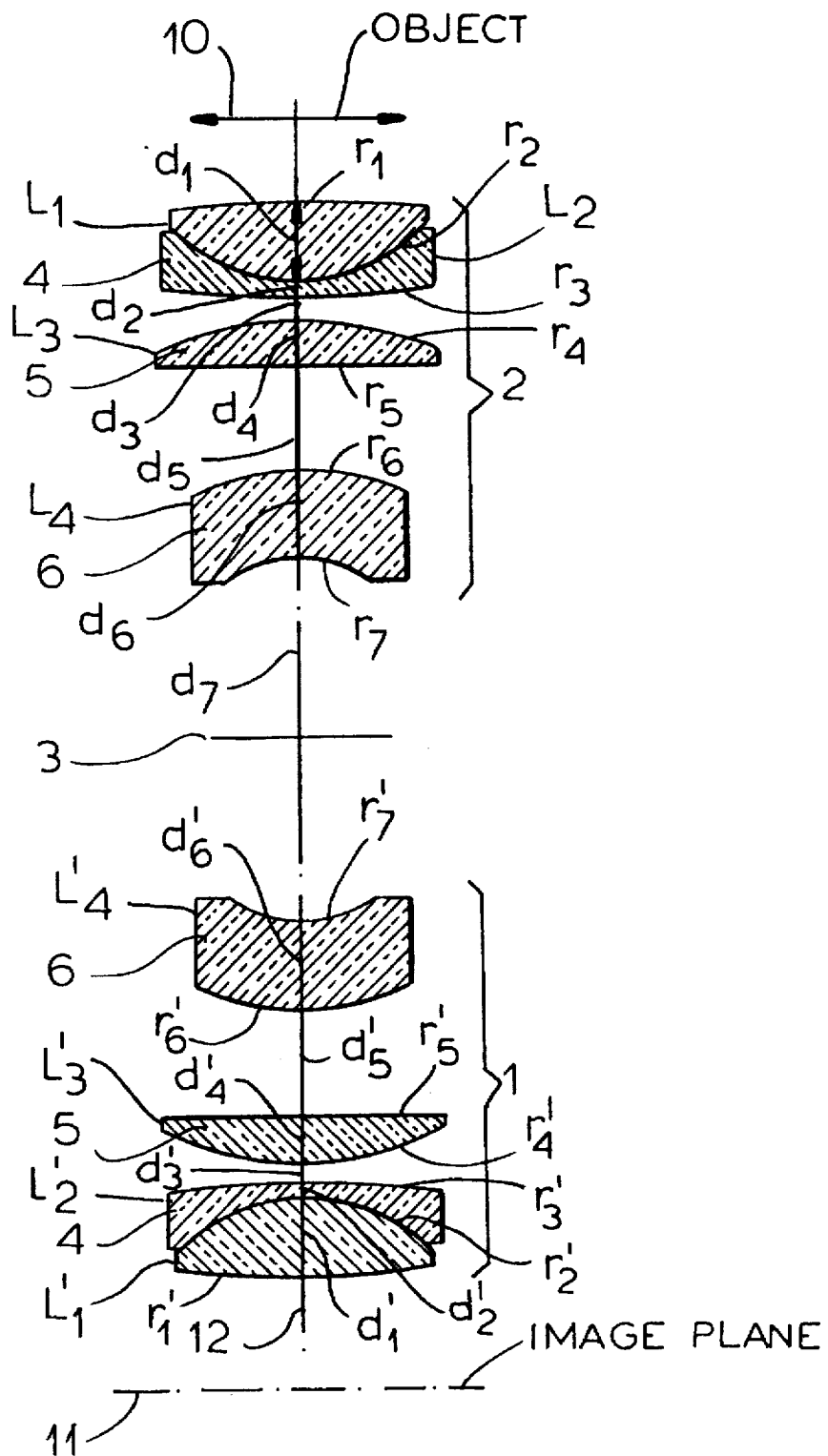
FIG. 1 is a diagram of a measurement objective for a magnification or reproduction ratio of −1 according to the invention.

FIG. 1 shows a double-sided telecentric objective for use in a measurement camera, e.g. of the type described in U.S. Pat. No. 5,453,785, which comprises an image-side optical system 1 and an object-side optical system 2 for the measurement of an object 10 and reproduction thereof in an image plane 11. The two optical systems are arrayed along a common optical axis 12 and, in the embodiment of FIG. 1 which is entirely symmetrical, midway between the optical systems, an iris diaphragm 3 is provided. The objective of FIG. 1 has a magnification ratio of −1 and an image size aperture of 0.14.

Each optical system 1, 2 is comprised of a cemented element 4 turned toward the object to be measured and the image plane, respectively, with a positive refractivity and a dispersive cemented surface (the surfaces with radii $r_2$ and $r_2$', respectively. The intermediate lens element of both the object-side and the image-side systems 2, 1, are collecting lenses 5 of a highly respective crown glass. Lying directly opposite the Iris diaphragm 3 are respective dispersive meniscuses 6 whose convex side is turned toward the object and the image respectively. For a two sided telecentic measurement objective with a magnification ratio −1 with a symmetrical configuration of the lenses, the object-image distance may be 284 and a range of object positions between 71 and 77 from the objective can be sustained without a detrimental effect upon the image quality when the image-side optical system has for its four lenses $L_1$' to $L_4$', the radii $r_1$' to $r_7$' and thicknesses of the lenses and air gaps $d_1$' to $d_6$', refractive indices and Abbé numbers as given in the following table:

| Lens | Radius | Thickness | $n_e$ | $v_e$ |
|---|---|---|---|---|
| $L_1$' | $r_1$' = 130.882 | $d_1$' = 9.60 | 1.4891 | 70.2 |
| $L_2$' | $r_2$' = −22.140 | $d_2$' = 2.00 | 1.6072 | 37.8 |
|  | $r_3$' = −127.464 | $d_3$' = 3.10 |  |  |
| $L_3$' | $r_4$' = 40.965 | $d_4$' = 5.70 | 1.6413 | 55.1 |
|  | $r_5$' = −597.046 | $d_5$' = 13.50 |  |  |
| $L_4$' | $r_6$' = 28.247 | $d_6$' = 11.39 | 1.5848 | 40.6 |
|  | $r_7$' = 15.845 |  |  |  | focal length: 57
distance to back focal point: 23.20 all thicknesses, radii, distances and lengths being in the same distance units.

In the symmetrical lens system of FIG. 1, the lenses $L_1$ through $L_4$ for radii $r_4$ to $r_7$ and thicknesses $d_1$ to $d_6$, refraction indices and Abbé numbers correspond to the numerical valves of the foregoing table as well.

Throughout this application, r refers to the radius of curvature of the respective lens surfaces, $n_e$ to the refractive index and $v_e$ to the Abbé number for the wavelength e=546 nm of the glass from which the lenses are constituted and d represents distances between the respective lens surfaces as measured along the optical axis.

Figure 2:
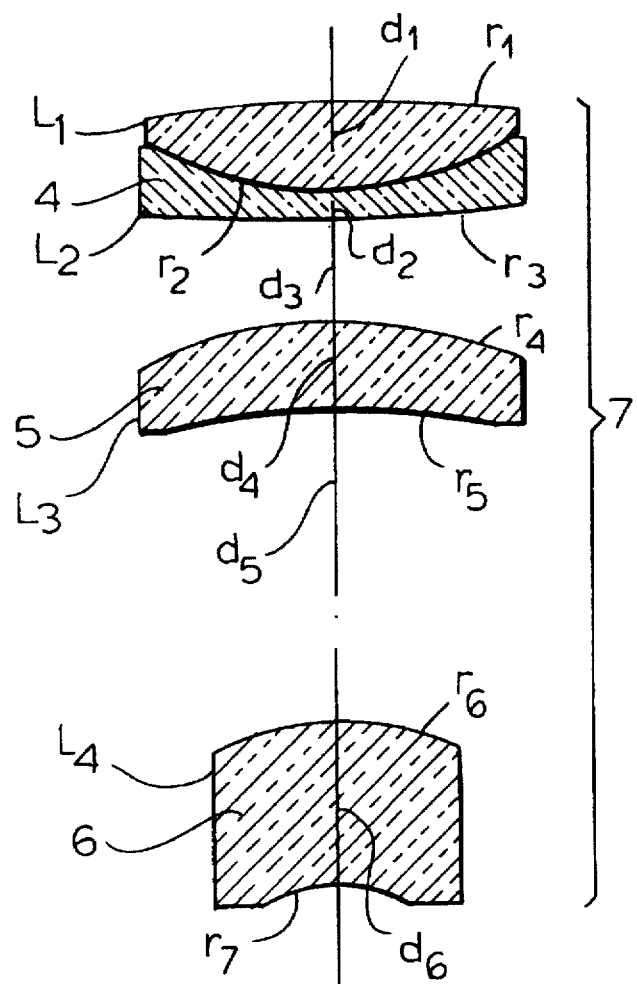
FIG. 2 is a diagram of a measurement objective for a magnification or reproduction ratio of −0.5 according to the invention.
Figure 2:
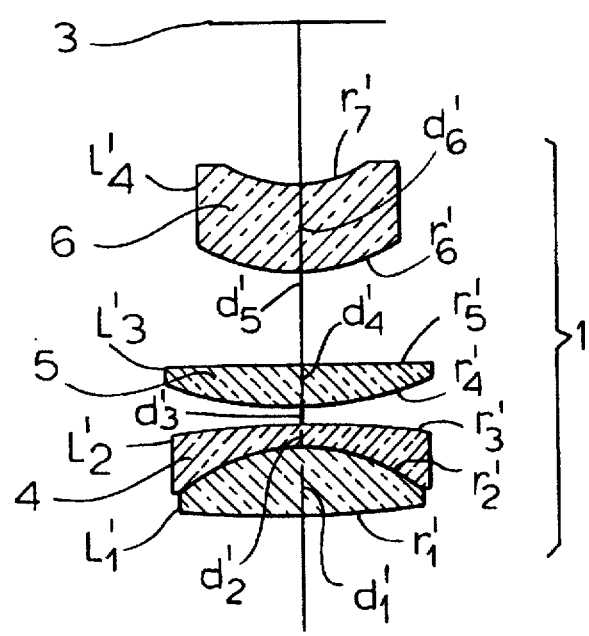

In FIG. 2, there is shown an embodiment of a double sided telecentric measuring objective with a magnification ratio of −0.5 and an image-side aperture of 0.14. The position of the object plane can vary within a distance range of 185 to 209 without detriment to the image quality. The object/image distance can then vary between 467 and 485 all thicknesses, radii, distances and lengths being in the same distance units. In this case, for the same construction of the image-side optical system as in FIG. 1, the numerical data of the object-side optical system can correspond to the following table:

| Lens | Radius | Thickness | $n_e$ | $v_e$ |
|---|---|---|---|---|
| $L_1$ | $r_1$ = 163.039 | $d_1$ = 12.00 | 1.4891 | 70.2 |
| $L_2$ | $r_2$ = −42.468 | $d_2$ = 4.00 | 1.6072 | 37.8 |
|  | $r_3$ = −219.485 | $d_3$ = 14.72 |  |  |
| $L_3$ | $r_4$ = 53.840 | $d_4$ = 11.40 | 1.6413 | 55.1 |
|  | $r_5$ = −96.899 | $d_5$ = 42.58 |  |  |
| $L_4$ | $r_6$ = 38.188 | $d_6$ = 22.78 | 1.5848 | 40.6 |
|  | $r_7$ = 20.358 |  |  |  | focal length: 114
distance to back focal point: 28.07 all thicknesses, radii, distances and lengths being in the same distance units.

Figure 3:
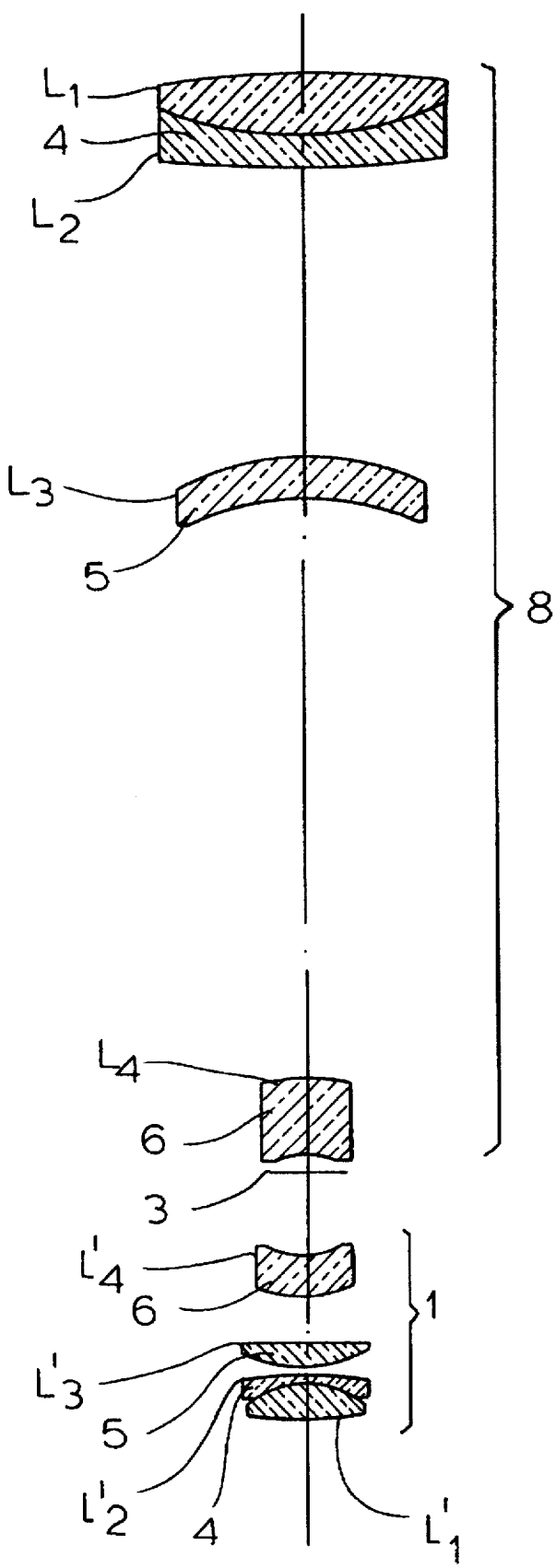
FIG. 3 is a diagram of a measurement objective for a magnification or reproduction ratio of −0.25 according to the invention.

In the third embodiment illustrated in FIG. 3, for a measuring objective with a magnification ratio of −0.25 and an image-side aperture of 0.14, the position of the object plane can vary at a distance of 246 through 342 from the objective without detriment to imaging quality. The object/image distance then varies between 505 and 595. While the image side optical system 1 corresponds to that given in connection with FIG. 1, the object side optical system 8 corresponds to the following numerical data:

| Lens | Radius | Thickness | $n_e$ | $v_e$ |
|---|---|---|---|---|
| $L_1$ | $r_1 = 243.547$ | $d_1 = 17.00$ | 1.4996 | 66.7 |
| $L_2$ | $r_2 = -88.326$ | $d_2 = 8.60$ | 1.6072 | 37.8 |
|  | $r_3 = -342.441$ | $d_3 = 82.40$ |  |  |
| $L_3$ | $r_4 = 72.157$ | $d_4 = 12.00$ | 1.6413 | 55.1 |
|  | $r_5 = -78.537$ | $d_5 = 163.70$ |  |  |
| $L_4$ | $r_6 = 47.746$ | $d_6 = 22.80$ | 1.5848 | 40.6 |
|  | $r_7 = 29.641$ |  |  |  | focal length: 228
distance to back focal point: 4.75 all thicknesses, radii, distances and lengths being in the same distance units.

I claim:

1. A double-sided telecentric measurement objective for contactless length measurement in two-dimensional and three-dimensional space, said objective comprising:

two optical systems, each comprising three lenses aligned along an optical axis and constituted of an object-side optical system and an image-side optical system, said object-side optical system having in succession from a side turned toward an object:

a cemented positively refracting lens element and a dispersive cemented surface formed by a convergent lens $L_1$ with radii of curvature $r_1$ and $r_2$ and a thickness $d_1$ and a divergent lens $L_2$ with radii of curvature $r_2$ and $r_3$ and a thickness $d_2$, a collecting lens $L_3$ spaced by an air gap of a thickness $d_3$ from said cemented lens element and having radii of curvature $r_4$ and $r_5$ and a thickness $d_4$ of a highly refractive crown glass, and a dispersive meniscus lens $L_4$ spaced by an air gap of thickness $d_5$ from said collecting lens and having radii of curvature of $r_6$ and $r_7$ and a thickness $d_6$;

and an image-side optical system having in succession from a side turned away from said object:

a cemented positively refracting lens element and a dispersive cemented surface formed by a convergent lens $L_1'$ with radii of curvature $r_1'$ and $r_2'$ and a thickness $d_1'$ and a divergent lens $L_2'$ with radii of curvature $r_2'$ and $r_3'$ and a thickness $d_2'$, a collecting lens $L_3'$ spaced by an air gap of a thickness $d_3'$ from said cemented lens element and having radii of curvature $r_4'$ and $r_5'$ and a thickness $d_4'$ of a highly refractive crown glass, and a dispersive meniscus lens $L_4'$ spaced by an air gap of thickness $d_5'$ from said collecting lens and having radii of curvature of $r_6'$ and $r_7'$ and a thickness $d_6'$ with a convex side turned away from said object;

widths of air gaps between the respective collecting lenses and the respective meniscuses being substantially greater than widths of air gaps between the cemented lens elements and the respective collecting lenses;

a back focal point of said object-side optical system coinciding with a front focal point of said image-side optical system so that a reproduction scale of the objective is equal to a ratio of front and back focal lengths of said optical systems, said image-side optical system having substantially the following numerical parameters wherein $n_e$ and $v_e$ are respectively the refractive indices and Abbé numbers of the respective lenses:

| Lens | Radius | Thickness | $n_e$ | $v_e$ |
|---|---|---|---|---|
| $L_1'$ | $r_1' = 130.882$ | $d_1' = 9.60$ | 1.4891 | 70.2 |
| $L_2'$ | $r_2' = -22.140$ | $d_2' = 2.00$ | 1.6072 | 37.8 |
|  | $r_3' = -127.464$ | $d_3' = 3.10$ |  |  |
| $L_3'$ | $r_4' = 40.965$ | $d_4' = 5.70$ | 1.6413 | 55.1 |
|  | $r_5' = -597.046$ | $d_5' = 13.50$ |  |  |
| $L_4'$ | $r_6' = 28.247$ | $d_6' = 11.39$ | 1.5848 | 40.6 |
|  | $r_7' = 15.845$ |  |  |  | focal length: 57
distance to back focal point: 23.20.

2. The objective defined in claim 1 wherein the lenses $L_1$ through $L_4$ have radii of curvature $r_1$ through $r_7$ and thicknesses $d_1$ through $d_6$, refractive indices and Abbé numbers corresponding to those of the lenses $L_1'$ to $L_4'$ for the radii $r_1'$ through $r_7'$ and thicknesses $d_1'$ through $d_6'$, and the respective refractive indices and Abbé numbers.

3. The objective defined in claim 1 wherein the object-side optical system has the following numerical parameter:

| Lens | Radius | Thickness | $n_e$ | $v_e$ |
|---|---|---|---|---|
| $L_1$ | $r_1 = 163.039$ | $d_1 = 12.00$ | 1.4891 | 70.2 |
| $L_2$ | $r_2 = -42.468$ | $d_2 = 4.00$ | 1.6072 | 37.8 |
|  | $r_3 = -219.485$ | $d_3 = 14.72$ |  |  |
| $L_3$ | $r_4 = 53.840$ | $d_4 = 11.40$ | 1.6413 | 55.1 |
|  | $r_5 = -96.899$ | $d_5 = 42.58$ |  |  |
| $L_4$ | $r_6 = 38.188$ | $d_6 = 22.78$ | 1.5848 | 40.6 |
|  | $r_7 = 20.358$ |  |  |  | focal length: 114
distance to back focal point: 28.07.

4. The objective defined in claim 1 wherein said object-side optical system has the following numerical parameter:

| Lens | Radius | Thickness | $n_e$ | $v_e$ |
|---|---|---|---|---|
| $L_1$ | $r_1 = 243.547$ | $d_1 = 17.00$ | 1.4996 | 66.7 |
| $L_2$ | $r_2 = -88.326$ | $d_2 = 8.60$ | 1.6072 | 37.8 |
|  | $r_3 = -342.441$ | $d_3 = 82.40$ |  |  |
| $L_3$ | $r_4 = 72.157$ | $d_4 = 12.00$ | 1.6413 | 55.1 |
|  | $r_5 = -78.537$ | $d_5 = 163.70$ |  |  |
| $L_4$ | $r_6 = 47.746$ | $d_6 = 22.80$ | 1.5848 | 40.6 |
|  | $r_7 = 29.641$ |  |  |  | focal length: 228
distance to back focal point: 4.75.

* * * * *